United States Patent
Stewart et al.

(10) Patent No.: US 8,117,831 B2
(45) Date of Patent: Feb. 21, 2012

(54) DIESEL EXHAUST GAS TEMPERATURE REDUCTION

(75) Inventors: Thomas Stewart, Waterford, MI (US);
Brent T. Deep, Fenton, MI (US);
Richard B. Downey, Holly, MI (US);
Douglas M. Kerchner, Goodrich, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1160 days.

(21) Appl. No.: 11/874,226

(22) Filed: Oct. 18, 2007

(65) Prior Publication Data
US 2009/0100826 A1 Apr. 23, 2009

(51) Int. Cl.
*F01N 3/00* (2006.01)
(52) U.S. Cl. .................. 60/293; 60/286; 60/289; 60/297
(58) Field of Classification Search .................... 60/273, 60/285, 286, 289, 293, 297, 274, 308, 315
See application file for complete search history.

(56) References Cited

U.S. PATENT DOCUMENTS

| | | | | |
|---|---|---|---|---|
| 4,864,825 A * | 9/1989 | Kakuta | ............................ | 60/598 |
| 5,133,228 A * | 7/1992 | Takata et al. | ..................... | 477/33 |
| 5,564,513 A * | 10/1996 | Wible et al. | ................... | 180/68.3 |
| 2004/0163398 A1* | 8/2004 | Morishita et al. | ............... | 62/186 |
| 2006/0112679 A1* | 6/2006 | Kojima et al. | ................... | 60/278 |
| 2007/0125073 A1* | 6/2007 | Reuter | .............................. | 60/286 |
| 2007/0197157 A1* | 8/2007 | Bellinger | ....................... | 454/155 |
| 2008/0087006 A1* | 4/2008 | Wu et al. | .......................... | 60/280 |

FOREIGN PATENT DOCUMENTS
WO  WO 2008069780 A1 *  6/2008
* cited by examiner

*Primary Examiner* — Thomas Denion
*Assistant Examiner* — Audrey K Bradley
(74) *Attorney, Agent, or Firm* — MacMillan, Sobanski & Todd, LLC

(57) ABSTRACT

An exhaust system for a vehicle having a diesel engine and a method of operation are disclosed. The exhaust system may include a diesel particulate filter, a pipe located downstream of the diesel particulate filter and an exhaust gas cooling assembly. The exhaust gas cooling assembly may have an air pump and a connecting pipe connected to the pipe and configured to direct air from the air pump into the pipe. During particulate filter regeneration, the air pump may be activated to push air into the exhaust in order to reduce the temperature of exhaust gasses exiting the vehicle.

12 Claims, 2 Drawing Sheets

DIESEL EXHAUST GAS TEMPERATURE REDUCTION

BACKGROUND OF INVENTION

The present invention relates generally to a vehicle exhaust system, and more particularly to a system and method for cooling exhaust gasses before exiting the vehicle exhaust system.

Recent emissions regulations for vehicles employing diesel engines limit the amount of soot that the vehicles may emit. The soot is produced as a by-product of the combustion of the diesel fuel and is carried out with the vehicle exhaust. Diesel particulate filters (also called traps) added to the exhaust system limit the soot emissions in order to meet the regulations.

Diesel particulate filters work by collecting the soot while allowing the exhaust gasses to pass through. As the vehicle operates, then, the soot builds up in the filter. This soot needs to be periodically eliminated from the filter in order to assure that the filter does not become clogged. A clogged filter can potentially cause damage to itself or the engine. The soot that builds up in the filter can be removed through a process called regeneration.

Regeneration is performed by heating the diesel particulate filter to a high temperature to burn away (incinerate) the soot, thus cleaning out the filter. However, during regeneration, the heat used to cause the regeneration process may cause the exhaust gasses to be expelled out of the tailpipe at higher temperatures than is desirable, as well as make the exhaust skin temperature higher than is desirable. Thus, it is desirable to cool the high temperature exhaust gasses that occur during regeneration before they are expelled from the exhaust system.

SUMMARY OF INVENTION

An embodiment contemplates an exhaust system for a vehicle having a diesel engine. The exhaust system may include a diesel particulate filter; a pipe located downstream of the diesel particulate filter and configured to receive exhaust gasses from the diesel particulate filter; and an exhaust gas cooling assembly having an air pump and a connecting pipe connected to the pipe and configured to direct air from the air pump into the pipe.

An embodiment contemplates a method of cooling exhaust gasses produced by a vehicle engine before the exhaust gasses are discharged from a vehicle exhaust system, the method comprising the steps of: operating the engine and exhaust system in a normal operating mode; monitoring at least one soot parameter indicative of soot build up in a diesel particulate filter while operating in the normal operating mode; determining from the at least one soot parameter when the diesel particulate filter needs regenerating; operating the vehicle in a regeneration mode, if it is determined that the diesel particulate filter needs regenerating; and selectively activating an air pump to pump ambient air into the exhaust gasses downstream of the diesel particulate filter before the exhaust gasses are discharged from the vehicle exhaust system when the vehicle is operating in the regeneration mode.

An advantage of an embodiment is that the exhaust cooling assembly mixes hot exhaust gasses with cooler air, thus lowering the temperature of the exhaust gasses before they are expelled from the exhaust system. This also reduces the temperature of the skin (exhaust pipe surfaces) downstream of the cooling assembly. This is particularly advantageous for vehicles having a diesel particulate filter that needs to be regenerated from time to time—especially when regeneration occurs during vehicle idle. The reduced skin temperatures may help to protect the underbody components and the exterior panels of the vehicle near the exhaust system.

DETAILED DESCRIPTION

Figure 1:
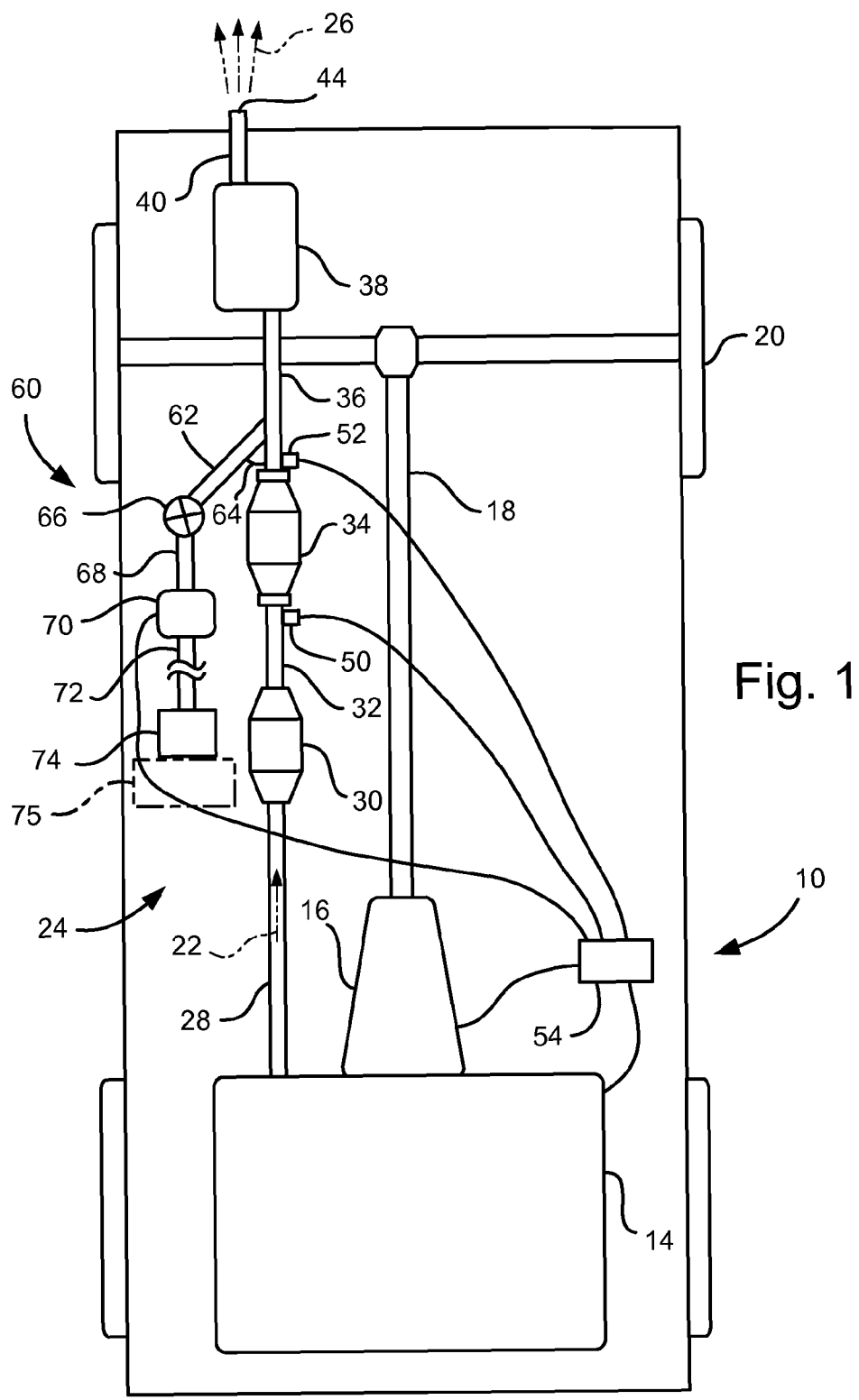
FIG. 1 is a schematic drawing of a vehicle showing a portion of an exhaust system for the vehicle.

FIG. 1 illustrates a vehicle 10 having an engine, which may be a diesel engine 14, mounted therein. The diesel engine 14 drives a transmission 16, which, in turn, drives a vehicle driveline 18, and, ultimately, vehicle wheels 20.

An exhaust system 24 receives exhaust gasses 22 from the diesel engine 14, treats the exhaust gasses 22, and directs them into the atmosphere away from the vehicle 10. More specifically, an exhaust pipe 28 connects at an upstream end to conventional exhaust system hardware (not shown), such as, for example, a turbocharger (not shown), that receives exhaust from exhaust manifolds (not shown) on the engine 14. The exhaust pipe 28 directs the exhaust gases 22 into a diesel oxidation converter 30 (also known as a diesel oxidation catalyst). The diesel oxidation converter 30 treats the exhaust gasses 22 in order to reduce the amounts of certain constituents that will be emitted into the atmosphere. Such constituents may be, for example, carbon monoxide (CO) and unburned hydrocarbons (HC).

A first intermediate pipe 32 connects to the downstream end of the diesel oxidation converter 30 and directs the exhaust gasses 22 into a diesel particulate filter 34 (also called a diesel particulate trap). The diesel particulate filter 34 is basically a filter for collecting (i.e., trapping) soot (also called diesel particulate matter) from the exhaust in order to minimize the amount of soot in the exhaust gasses 22. Downstream of the diesel particulate filter 34 is a second intermediate pipe 36. The second intermediate pipe 36 directs the exhaust gasses 22 into a muffler 38. Alternatively, the exhaust system 24 has no muffler or second intermediate pipe and the diesel particulate filter 34 directs the exhaust gasses 22 directly into a tailpipe 40. The tailpipe 40 includes a downstream end 44 where an exhaust gas or exhaust gas/ambient air mixture 26 (discussed below) are emitted into the atmosphere away from the vehicle 10.

The exhaust system 24 may also include an upstream pressure sensor 50, which is mounted just prior to exhaust gas entry into the diesel particulate filter 34 in order to measure the pressure in the exhaust gas stream just prior to entry into the filter 34. A downstream pressure sensor 52 may be mounted in the exhaust system 24 just after the exhaust exit from the diesel particulate filter 34 in order to measure the pressure in the exhaust gas stream after exit from the filter 34. Both the upstream and downstream pressure sensors 50, 52 are in communication with a controller 54. The controller 54 may be made up of one or more discrete controllers, and may be formed from various combinations of software and hardware, as is known to those skilled in the art. The controller 54 may also be in communication with various components or other controllers associated with the diesel engine 14 and transmission 16, as is known to those skilled in the art.

The Exhaust system 24 also includes an exhaust gas cooling assembly 60. The exhaust gas cooling assembly 60 includes a connecting pipe 62 that connects to the second intermediate pipe 36 just downstream of the diesel particulate filter 34. The connecting pipe 62 preferably connects to the second intermediate pipe 36 at an angle 64 of about forty-five degrees in order to minimize back pressure. A one-way check valve 66 is connected to the connecting pipe 62 and is oriented to allow air flow through the connecting pipe 62 into the second intermediate pipe 36 but prevent backflow from the second intermediate pipe 36 through the one-way check valve 66. The check valve 66, then, protects the exhaust gas cooling assembly 60 from the main engine exhaust flow (backward flow of high temperature exhaust gas can sometimes occur during a back fire event).

A pump outlet pipe 68 connects at a downstream end to the check valve 66 and at an upstream end to an air pump (electric blower) 70. The air pump 70 is controlled by the controller 54. A pump inlet pipe 72 connects at a downstream end to the air pump 70 and connects at an upstream end to an ambient air source 74. The ambient air source 74 may be the atmosphere outside the vehicle 10 if measures are taken to assure that the intake air is reasonably clean and dry, or the air source 74 may come from inside the vehicle's cab 75 (shown in phantom line in FIG. 1) so long as the check valve 66 (or an additional check valve (not shown)) would not allow exhaust fumes to flow back into the cab.

The flow of exhaust gasses through the exhaust system 24 is the same as a conventional engine under normal operating conditions. When the vehicle engine 14 is running, the exhaust gasses 22 produced by the engine 14 flow through the exhaust pipe 28, diesel oxidation converter 30, first intermediate pipe 32, diesel particulate filer 34 (where particulates are trapped), second intermediate pipe 36, and muffler 38 (which is optional). The exhaust gasses (or exhaust/air mixture) 26 then flow from the tailpipe 40 out into the atmosphere.

Figure 2:
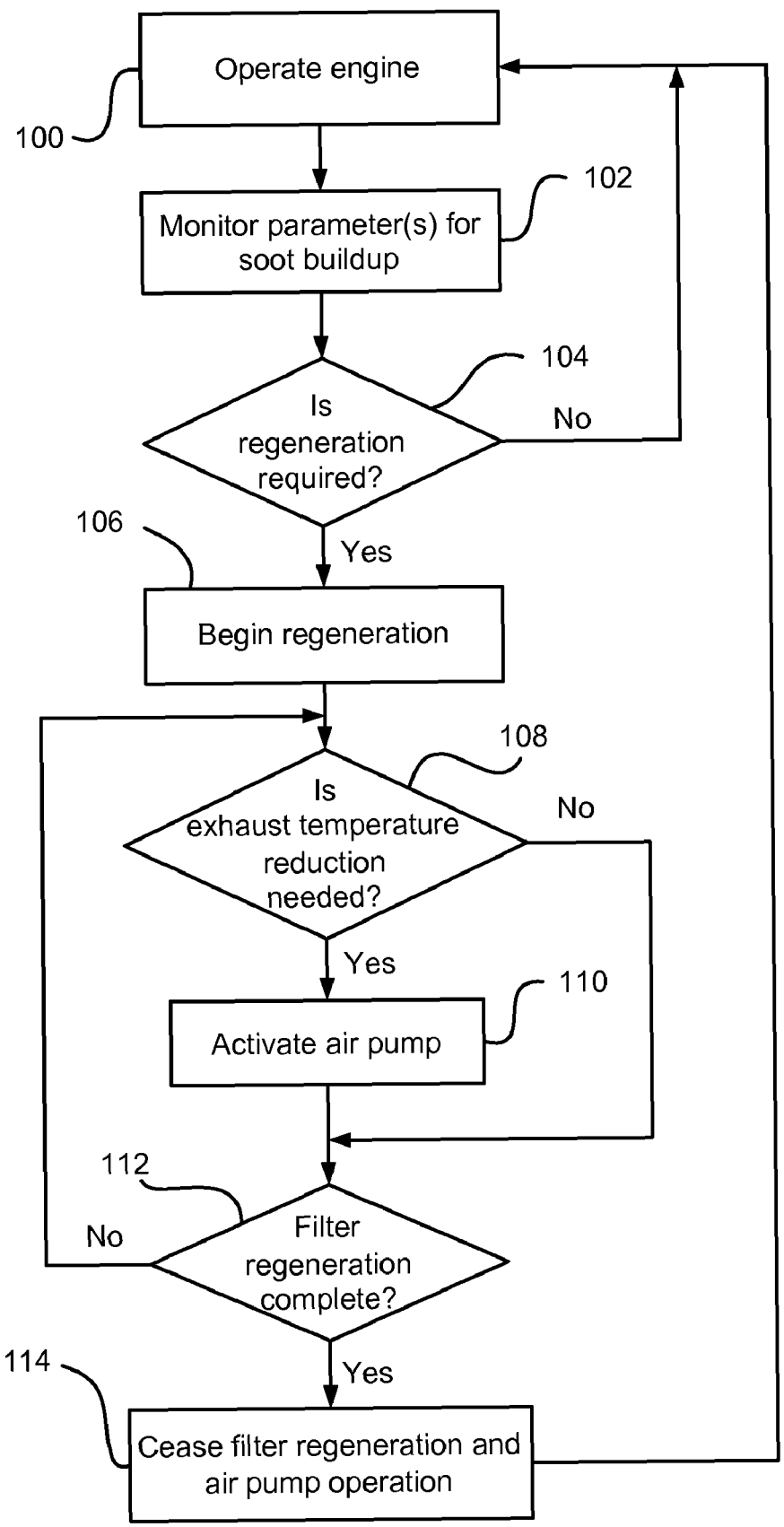
FIG. 2 is a flow chart illustrating a process for cooling exhaust gases during regeneration of a particulate filter used in a vehicle exhaust system.

A method of cooling exhaust gasses shown in FIG. 2 will now be discussed as it relates to the vehicle 10 of FIG. 1. As the engine 14 is operated, block 100, the parameter or parameters for soot build-up in the particulate filter 34 are monitored, block 102. A comparison is made between the soot buildup parameter(s) and predetermined threshold(s) to determine if soot regeneration is required, step 104. If not, then the monitoring continues.

At some point, a determination is made (step 104) that the soot needs to be burned off (i.e., the filter regenerated) in order to avoid clogging the diesel particulate filter 34. The determination of when the regeneration mode will be initiated can be based on one or more of several factors (parameters). For example, the controller 54 may keep track of engine run time, vehicle mileage or fuel consumption since the last regeneration process occurred, and initiate the regeneration process after a predetermined amount of engine run time, vehicle mileage or fuel consumption, as the case may be. For another example, the controller 54 may determine the pressure drop across the particulate filter 34 by calculating the difference in measured pressure between the upstream pressure sensor 50 and the downstream pressure sensor 52, with the regeneration process initiated when a predetermined pressure difference across the particulate filter 34 is reached. Or, the controller 54 may employ a soot regeneration algorithm that estimates an amount of soot build-up based upon some combination of two or more of the previous listed factors, or other factors.

When the determination is made that regeneration of the particulate filter 34 is needed, the controller 54 begins the regeneration process, step 106. The controller 54 will cause the regeneration process to occur by various known means. The particular actions taken by the controller 54 may depend upon the engine and vehicle operating conditions as well as the ambient conditions. In essence, the temperature is raised sufficiently to cause soot to burn off.

The regeneration process for the filter 34 can cause the temperature of the exhaust gas 22 to rise significantly over normal operating conditions. Under certain vehicle operating conditions, this high exhaust gas temperature exiting to atmosphere may be particularly undesirable. For example, if regeneration occurs during engine idle while the vehicle is stopped. Accordingly, a determination is made whether exhaust temperature reduction is needed, block 108. If not, then regeneration continues without the air pump 70 being activated. If temperature reduction is needed, then the air pump 70 is activated, block 110. Alternatively, the air pump 70 may be activated every time regeneration is begun rather than only for certain operating conditions, if so desired.

Once activated, the air pump 70 draws air in from the ambient air source 74, and directs it through the pump outlet pipe 68, check valve 66 and connecting pipe 62 into the second intermediate pipe 36. The ambient air mixes with the exhaust gasses, absorbing some of the heat energy of the exhaust gasses as they are mixed. Thus, the overall temperature of the exhaust/ambient air mixture 26 exiting the tailpipe 40 is lower than if just the exhaust gasses were exiting the tailpipe 40.

As a non-limiting example, a vehicle having a diesel engine may operate in a filter regeneration mode while at idle (zero vehicle speed). With air supplied at a rate of about sixty-five cubic feet per minute, the temperatures of the gasses exiting the vehicle may drop from about 553 degrees Celsius to about 214 degrees Celsius.

If filter regeneration is not complete, block 112, the regeneration continues. The controller 54 continues with the process until the desired amount of regeneration is achieved. This may be based, for example, on a predetermined pressure drop across the particulate filter 34 being achieved, a predetermined length of regeneration time, or a soot regeneration algorithm that estimates the amount of soot burn-off achieved. The air pump 70 may need to operate, for example, for up to twenty minutes until completion of the regeneration process. When regeneration is complete, the regeneration operation and the air pump operation are stopped, block 114, and normal operation is resumed.

While certain embodiments of the present invention have been described in detail, those familiar with the art to which this invention relates will recognize various alternative designs and embodiments for practicing the invention as defined by the following claims.

What is claimed is:

1. An exhaust system for a vehicle having a diesel engine comprising:
   a diesel particulate filter;
   a pipe located downstream of the diesel particulate filter and configured to receive exhaust gasses from the diesel particulate filter; and
   an exhaust gas cooling assembly having a selectively operable air pump and a connecting pipe connected to the pipe and configured to direct air from the air pump into the pipe, the exhaust gas cooling assembly including an ambient air source configured to draw air from within a cab of the vehicle.

2. The exhaust system of claim 1 wherein the exhaust gas cooling assembly includes a one-way check valve configured to prevent flow from the pipe to the air pump.

3. The exhaust system of claim 1 wherein the pipe includes an intermediate pipe, a muffler and a tailpipe having a downstream end opening to atmosphere.

4. The exhaust system of claim 1 wherein the connecting pipe connects to the pipe at a forty five degree angle.

5. The exhaust system of claim 1 including a controller, an upstream pressure sensor located adjacent to an upstream end of the diesel particulate filter and operable to measure an upstream pressure in the exhaust gasses, and a downstream pressure sensor located adjacent to a downstream end of the diesel particulate filter and operable to measure a downstream pressure in the exhaust gasses, with the upstream and downstream pressure sensors in communication with the controller.

6. The exhaust system of claim 1 including a controller configured to control the activation of the air pump, the controller in communication with a vehicle engine and transmission for determining when air pump activation is required.

7. An exhaust system for a vehicle having a diesel engine comprising:
   a diesel particulate filter;
   a pipe located downstream of the diesel particulate filter and configured to receive exhaust gasses from the diesel particulate filter; and
   an exhaust gas cooling assembly having a selectively operable air pump, a connecting pipe connected to the pipe and configured to direct air from the air pump into the pipe, and a one-way check valve mounted between the air pump and connecting pipe and configured to prevent flow from the pipe to the air pump, and wherein the connecting pipe connects to the pipe at a forty five degree angle, and wherein the exhaust gas cooling assembly includes an ambient air source configured to draw air from within a cab of the vehicle.

8. The exhaust system of claim 7 including a controller configured to control the activation of the air pump, the controller in communication with a vehicle engine and transmission for determining when air pump activation is required.

9. The exhaust system of claim 7 including a controller, an upstream pressure sensor located adjacent to an upstream end of the diesel particulate filter and operable to measure an upstream pressure in the exhaust gasses, and a downstream pressure sensor located adjacent to a downstream end of the diesel particulate filter and operable to measure a downstream pressure in the exhaust gasses, with the upstream and downstream pressure sensors in communication with the controller.

10. A method of cooling exhaust gasses produced by a vehicle engine before the exhaust gasses are discharged from a vehicle exhaust system, the method comprising the steps of:
    (a) operating the engine and exhaust system in a normal operating mode;
    (b) monitoring at least one soot parameter indicative of soot build up in a diesel particulate filter while operating in the normal operating mode;
    (c) determining from the at least one soot parameter when the diesel particulate filter needs regenerating;
    (d) operating the vehicle in a regeneration mode, if it is determined in step (c) that the diesel particulate filter needs regenerating; and
    (e) selectively activating an air pump to pump ambient air from within the cab of the vehicle into the exhaust gasses downstream of the diesel particulate filter before the exhaust gasses are discharged from the vehicle exhaust system when the vehicle is operating in the regeneration mode, and when a determination is made whether exhaust temperature reduction is needed while operating the vehicle in the regeneration mode before activating the air pump.

11. The method of claim 10 further including the step of preventing the exhaust gasses from flowing downstream of the diesel particulate filter into the air pump.

12. The method of claim 10 wherein step (e) is further defined by directing the pumped ambient air into the exhaust gasses at an angle of forty five degrees.

\* \* \* \* \*